US012789369B1

(12) United States Patent
Rotem et al.

(10) Patent No.: US 12,789,369 B1
(45) Date of Patent: Nov. 10, 2026

(54) VACUUM GRIPPER WITH AI-BASED CONTROL SYSTEM

(71) Applicant: Grabo Ltd, Sheung Wan (HK)

(72) Inventors: Ariel Rotem, Hoboken, NJ (US); Efraim Rotem, Santa Clara, CA (US); Nimrod Rotem, Sheung Wan (HK)

( * ) Notice: Subject to any disclaimer, the term of this patent is extended or adjusted under 35 U.S.C. 154(b) by 25 days.

(21) Appl. No.: 19/356,047

(22) Filed: Oct. 11, 2025

(51) Int. Cl.
*B25J 9/16* (2006.01)
*B25J 15/06* (2006.01)
*G05B 13/02* (2006.01)

(52) U.S. Cl.
CPC ........... *B25J 9/163* (2013.01); *B25J 15/0616* (2013.01); *G05B 13/027* (2013.01)

(58) Field of Classification Search
USPC .......................................................... 700/282
See application file for complete search history.

(56) References Cited

U.S. PATENT DOCUMENTS

2014/0201571 A1* 7/2014 Hosek .................... B25J 9/1674 714/26
2017/0341880 A1* 11/2017 Strobel ................. B66C 1/0218
2018/0127219 A1* 5/2018 Wagner .................. B65G 47/40
2021/0071508 A1* 3/2021 Beck ................... F04D 15/0066
2022/0331993 A1* 10/2022 Nguyen .................. F16B 47/00
2023/0321847 A1* 10/2023 Sheikholeslami ... B25J 15/0052 294/183
2023/0376784 A1* 11/2023 Hussein ............... G06N 3/0455
2024/0058953 A1* 2/2024 Stanton .................. B25J 9/1697
2024/0139971 A1* 5/2024 Mason ................. B25J 15/0616
2025/0116565 A1* 4/2025 Falk ..................... B25J 15/0616
2025/0282062 A1* 9/2025 O'Neil ................. B25J 15/0691

OTHER PUBLICATIONS

Kern et al. Universal_inline_sensors_for_vacuum_gripping_systems, IEEE, p. 544-547, 2018. (Year: 2018).*
DE_102011118168_A1 (Year: 2013).*
WO_2023011880_A1 (Year: 2023).*
EP_3626412_A1 (Year: 2020).*
WO_2007036259_A1 (Year: 2007).*
CN_117413238_A (Year: 2024).*

* cited by examiner

*Primary Examiner* — Hien D Khuu
(74) *Attorney, Agent, or Firm* — Intellent Patents LLC; Ahmed Alhafidh

(57) ABSTRACT

A vacuum gripper comprises a base element, a seal element, a vacuum pump, at least one sensor, and a machine learning electronic controller. The sensor generates sensor data indicative of operational parameters including at least one of air pressure, velocity, acceleration, temperature, and force. The machine learning electronic controller includes one or more processor(s) and a non-transitory storage medium storing machine-readable instructions. When executed by the processor(s), the instructions cause the vacuum gripper to receive the sensor data, execute a machine learning control program comprising an artificial intelligence model, perform inference operations on the sensor data, and generate control outputs based on the inference operations. The control outputs regulate vacuum pump operating modes to maintain optimal grip force while minimizing energy consumption.

14 Claims, 7 Drawing Sheets

VACUUM GRIPPER WITH AI-BASED CONTROL SYSTEM

FIELD OF TECHNOLOGY

The present invention relates to vacuum gripping devices for handling objects. More particularly, the invention relates to intelligent control systems for vacuum grippers that utilize machine learning to optimize vacuum pump operation. Still more particularly, the invention relates to a portable vacuum gripper with an artificial intelligence controller that processes sensor data to dynamically adjust vacuum pressure in response to changing operational conditions.

BACKGROUND

Vacuum grippers are power tools that utilize vacuum pressure to grip and lift loads. These devices typically employ either passive suction cups or active vacuum pumps to create negative pressure between the gripper and an object surface, thereby generating holding force. The present invention relates more specifically to hand-held, battery-operated vacuum grippers that employ electric pumps to generate and maintain the vacuum pressure required for gripping operations.

Existing vacuum gripper solutions employ various control strategies to maintain adequate grip force. Some conventional systems operate the vacuum pump continuously at full power throughout the gripping operation to ensure sufficient holding force under all conditions. Other existing solutions attempt to conserve battery power by controlling the vacuum pressure to a predetermined maximum level designed to accommodate worst-case operational scenarios, such as maximum load weight, extreme angles, or rapid acceleration. These control approaches typically utilize simple on-off switching mechanisms or basic proportional control systems with fixed operating parameters.

However, these conventional control approaches suffer from significant limitations. Continuous pump operation at maximum power results in excessive energy consumption, particularly when gripping smooth surfaces or light objects that require minimal vacuum pressure. Fixed worst-case pressure control, while somewhat more efficient than continuous operation, still applies more vacuum pressure than necessary for most actual operating conditions, thereby unnecessarily draining battery capacity and reducing operational time between charges. Furthermore, these approaches fail to adapt to varying surface textures, different load weights, changing angles of operation, or dynamic forces induced by user movement and acceleration. As a result, conventional vacuum grippers either consume excessive energy or risk inadequate grip force when conditions deviate from the predetermined control parameters.

There remains an unmet need in the field for a vacuum gripper control system capable of dynamically optimizing vacuum pressure in real-time based on actual operational conditions. The challenge lies in the complexity of accurately determining the minimum vacuum pressure required at any given moment, which depends on multiple interrelated variables including object weight, surface texture affecting seal quality, gripper orientation relative to gravity, velocity and acceleration of movement, and rate of air leakage through the seal. Traditional control algorithms such as PID controllers require careful tuning for specific operational ranges and often fail when conditions change rapidly or fall outside their tuned parameters. The computational complexity of simultaneously processing multiple sensor inputs, predicting force requirements, and adjusting pump operation in real-time has hindered the development of truly adaptive vacuum gripper control systems. Artificial intelligence and machine learning techniques offer a promising solution to this complex, multi-variable control problem by enabling the system to learn optimal control strategies from operational data and adapt to varying conditions without requiring explicit programming of all possible scenarios.

SUMMARY

Disclosed is a vacuum gripper with an artificial intelligence-based control system that dynamically optimizes vacuum pump operation based on real-time sensor feedback.

According to a first aspect of the present invention, there is provided a vacuum gripper comprising a rigid base element, a loop-shaped vacuum seal element, a vacuum pump, at least one sensor, and a machine learning electronic controller. The base element has a first side and a second side opposite to the first side, with the second side having a central area and a periphery surrounding the central area. The vacuum seal element is attached to the second side of the base element closer to the periphery than to the central area and protrudes therefrom in a direction away from the first side. The vacuum seal element comprises a contact surface configured to be brought into at least partial contact with an object surface and an encircling surface oriented transversely to the contact surface and at least partially facing towards the central area so as to define a chamber at the second side of the base element. The vacuum seal element is elastically deformable at least at its contact surface to enable the contact surface to conform to the object surface when pressed thereagainst.

The vacuum pump is mounted to the first side of the base element so as to be in fluid communication with the chamber through the base element and is configured to extract air from the chamber to cause the contact surface to be urged towards and thereby grip the object surface when pressed thereagainst.

The at least one sensor is configured to generate sensor data indicative of operational parameters of the vacuum gripper. In various embodiments, the sensor may comprise one or more of: a pressure sensor configured to measure pressure within the chamber; an accelerometer configured to measure angle, velocity, or acceleration of the vacuum gripper; a temperature sensor configured to measure air temperature; and a force sensor configured to provide readings indicative of object weight, lift force, or acceleration force.

The machine learning electronic controller is supported at least indirectly by the base element and comprises at least one processing element and a non-transitory storage medium storing machine-readable instructions. When executed by the processing element, the instructions cause the controller to receive the sensor data from the at least one sensor, execute a machine learning control program comprising an artificial intelligence inference model, perform inference operations on the sensor data using the artificial intelligence model, and generate control outputs based on the inference operations. The control outputs regulate the operating mode of the vacuum pump to maintain adequate grip force while minimizing energy consumption.

The vacuum pump control system operates through a pump control apparatus functionally coupled between the machine learning controller and the vacuum pump. In various embodiments, the control outputs from the artificial intelligence inference model may be configured to control the pump through different modalities. In one embodiment, the pump control apparatus comprises an electronic on/off switch that activates or deactivates the pump based on binary control signals from the controller, enabling simple two-state operation. In another embodiment, the pump control apparatus comprises a variable speed controller that adjusts pump rotational speed to vary the rate of air extraction, thereby providing graduated control of vacuum pressure. In a further embodiment, the pump control apparatus comprises a pulse-width modulation (PWM) controller that regulates average pump power by rapidly switching the pump on and off with variable duty cycles, enabling precise control of vacuum level while maintaining energy efficiency. In yet another embodiment, the inference model output layer may generate control parameters for a secondary control system, such as proportional gain (Kp), integral gain (Ki), and derivative gain (Kd) values for a PID controller, wherein the PID controller uses these AI-generated parameters to provide closed-loop pump control. The pump may thus be operated in steady continuous mode, variable power mode, pulsed or intermittent mode, or combinations thereof, with the specific operating mode being determined by the artificial intelligence model based on current operational conditions such as surface texture, load weight, gripper orientation, and detected air leakage rates.

In certain embodiments, the vacuum gripper is a portable or hand-held device and further comprises a power source such as a battery pack, thereby eliminating the need for mains connection or wired power that could constitute a trip hazard. In some embodiments, the vacuum gripper comprises a handle for holding and manipulating the device, wherein at least one of the power source and the pump may be at least partially disposed within the handle to achieve a compact and portable configuration.

In additional embodiments, the vacuum gripper may comprise a bracing structure protruding from the second side of the base element to a lesser extent than the vacuum seal element. The bracing structure is made of a material more rigid than that of the vacuum seal element and extends at least along a part of the vacuum seal element to provide support and prevent over-compression of the seal while allowing initial deformation to conform to object surfaces.

According to various aspects of the invention, the machine learning control program implements an artificial intelligence inference model that has been trained using operational data collected during product development, field usage, or both. The AI model comprises an input layer configured to receive sensor data, at least one hidden layer configured to process the data, and an output layer configured to generate control outputs. The model may be implemented using various neural network architectures including feed-forward neural networks, convolutional neural networks, recurrent neural networks, Perceptron or combinations thereof.

In certain embodiments, the controller further comprises a sensor pre-processing function that normalizes sensor data, computes derivatives to determine rates of change, or performs integration to calculate average values over time intervals. The pre-processed data is then provided to the artificial intelligence model for inference operations.

In further embodiments, the machine learning controller is configured to detect trigger events based on sensor data, operational parameters, or usage patterns. Trigger events may include failure conditions, near-failure conditions, or operational parameters exceeding predetermined thresholds. Upon detecting a trigger event, the controller may generate a secondary control output, such as activating the pump to maximum capacity or triggering an alarm signal. The controller may also store sensor data associated with trigger events in memory for subsequent analysis.

In still further embodiments, the vacuum gripper comprises a communication module operatively connected to the controller. The communication module enables bidirectional data exchange with remote systems, allowing the controller to transmit stored operational data and failure information to a remote training server for analysis and model refinement. The communication module also enables the controller to receive updated artificial intelligence models and control programs, thereby allowing continuous improvement of system performance based on field data collected from multiple vacuum gripper units.

The artificial intelligence-based control approach addresses the computational complexity of determining optimal vacuum pressure in real-time by learning patterns from operational data rather than relying on explicitly programmed control rules. This enables the system to adapt to varying surface textures, different load weights, changing orientations, and dynamic forces induced by user movement without requiring manual tuning or predetermined operating parameters.

One advantage of the present invention is improved energy efficiency compared to conventional continuous pump operation or worst-case pressure control strategies. By dynamically adjusting vacuum pressure to match actual operational requirements through variable pump control modalities, the invention extends battery operational time and reduces the frequency of charging cycles.

Another advantage is enhanced reliability and safety through real-time adaptation to changing conditions. The AI-based controller can detect developing failure conditions and apply corrective actions before load detachment occurs, thereby reducing the risk of dropped objects and associated safety hazards.

A further advantage is continuous improvement capability through field data collection and model updates. As the system collects operational data from multiple users and environments, the AI models can be refined and updated to improve performance across a broader range of conditions than could be anticipated during initial product development.

These and other features, aspects, and advantages of the present invention will become better understood with reference to the following description and appended claims.

BRIEF DESCRIPTION OF THE DRAWINGS

In order to better understand the subject matter that is disclosed herein and to exemplify how it can be carried out in practice, embodiments will now be described, by way of non-limiting example only, with reference to the accompanying drawings, in which.

Other features of the present embodiments will be apparent from the accompanying drawings and from the detailed description that follows.

DETAILED DESCRIPTION

A vacuum gripper is a device suitable for gripping an object at an object surface due to a vacuum which is created between the vacuum gripper and the object surface.

Figure 1:
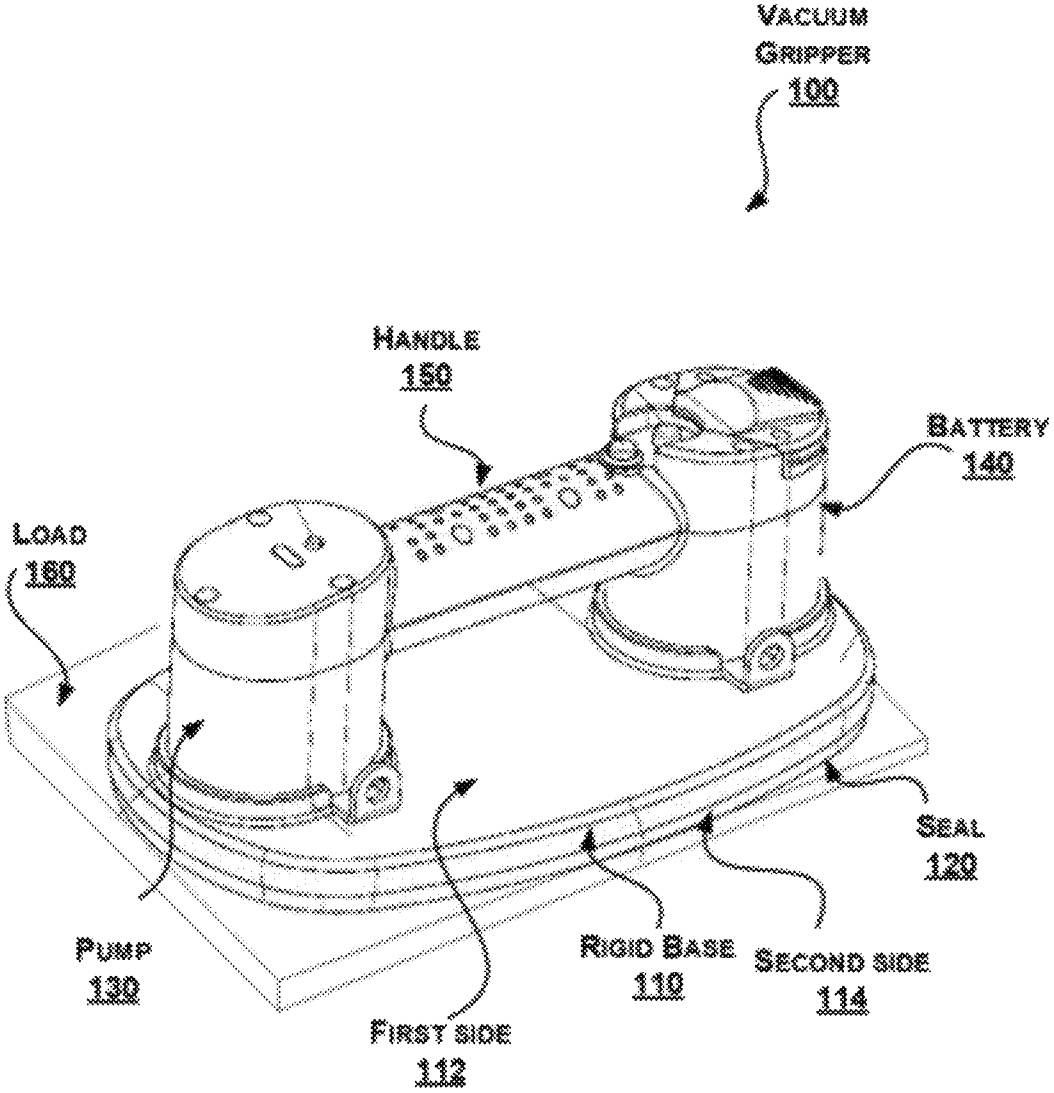
FIG. 1 shows a perspective view of a vacuum gripper according to one example of the presently disclosed subject matter.

According to one example, as schematically shown in FIG. 1, a vacuum gripper 100 comprises a rigid base element 110 having a first side 112 and a second side 114 opposite to the first side 112. The vacuum gripper 100 further comprises a loop-shaped vacuum seal element 120 attached to the second side 114 of the base element 110. The vacuum seal element 120 protrudes from the second side 114 of the base element 110 in a direction away from the first side 112 of the base element 110. The vacuum seal element 120 is oriented transversely to the contact surface so as to define a chamber at the second side 114 of the base element 110. The vacuum gripper 100 further comprises an air extraction means 130 also referred to herein as a vacuum pump or pump, mounted to the first side 112 of the base element 110 so as to be in fluid communication with the chamber inside the seal 120 through the base element 110. The air extraction means 130 is configured to extract air from the chamber to cause the contact surface to be urged towards and thereby grip an object surface when pressed thereagainst. The vacuum gripper 100 also comprises a handle 150.

It will be understood by those skilled in the art that the term "vacuum pump" as used throughout this specification encompasses various types of air extraction devices capable of creating negative pressure or vacuum conditions, including but not limited to centrifugal pumps, diaphragm pumps, rotary vane pumps, impeller-based systems operatively coupled to direct current (DC) motors or brushless motors, and other suitable air extraction means. The specific pump configuration may be selected based on application requirements such as portability, power consumption, vacuum level, and flow rate.

Figure 2A:
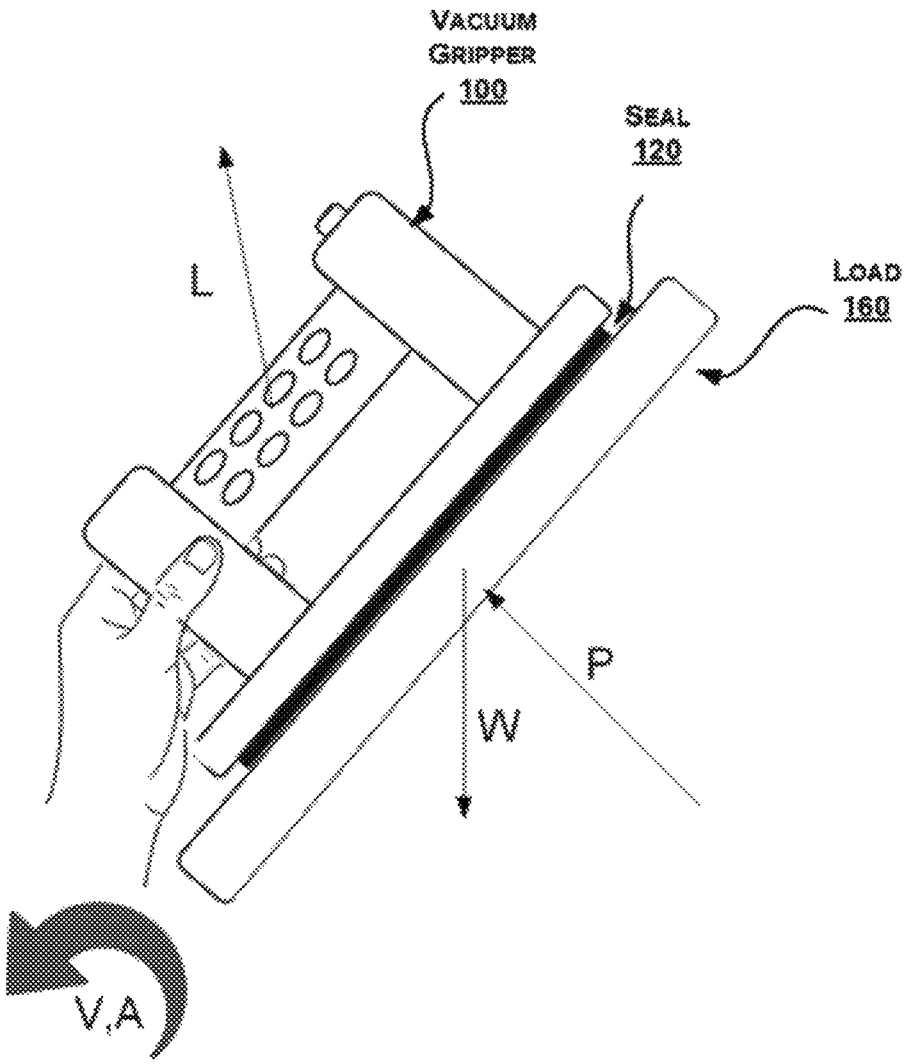
FIG. 2A shows simplified vectors of forces acting on the vacuum gripper and load

Referring to FIG. 2A, the vacuum gripper apparatus 100 is configured to generate a holding force P by creating a vacuum condition within the seal 120, thereby enabling the apparatus to lift a load 160 having a weight W. An operator applies a lifting force L in the appropriate direction and magnitude to manipulate the vacuum gripper apparatus. The minimum vacuum pressure required must be sufficient to generate an adequate holding force P that is equal to or greater than the vector summation of forces acting to detach the load 160 from the vacuum gripper apparatus 100.

The detaching forces comprise a static component representing the vector sum of forces that are a function of the angular orientation of the vacuum gripper apparatus relative to a vertical reference direction. Additionally, dynamic forces are induced by acceleration according to the relationship $F=ma$, where m represents the mass of the load and a represents the acceleration imparted to the system. FIG. 2A illustrates only a representative subset of the forces acting on the system; it will be understood that the actual forces, velocities, and accelerations are three-dimensional in nature and have been simplified in FIG. 2A for clarity of illustration. The control system must account for both static gravitational forces and dynamic acceleration forces to maintain adequate vacuum pressure and prevent inadvertent release of the load 160. In various embodiments, force sensors may be integrated at one or more locations on the vacuum gripper apparatus 100 to generate sensor data indicative of the various force components acting on the system.

Figure 2B:
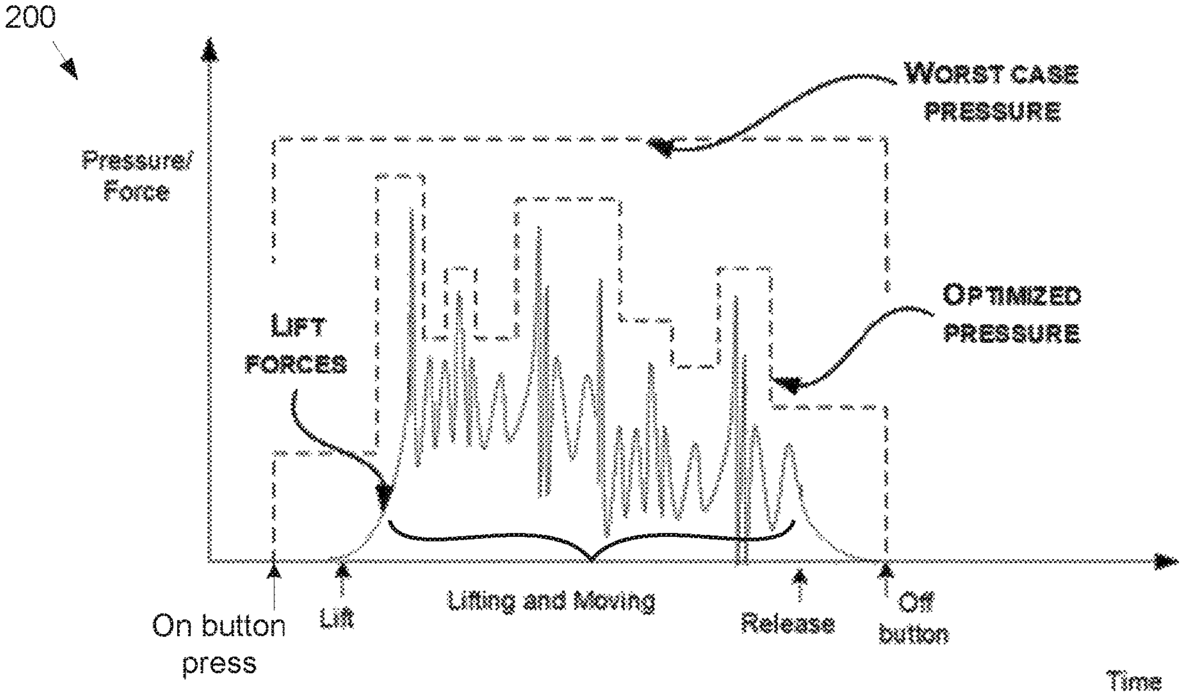
FIG. 2B shows a time diagram of load forces and vacuum pressure on a working vacuum gripper.

Referring to FIG. 2B, a graphical representation 200 illustrates the operational characteristics of the vacuum gripper apparatus during a typical lifting cycle. The chart depicts the relationship between pressure/force magnitude and time during normal operation of the apparatus. The operational cycle comprises distinct phases: an initial activation phase when an on-button is pressed, a lifting phase, a lifting and moving phase characterized by variable lift forces, a release phase, and a termination phase when an off-button is pressed. This cycle can also be referred to as "normal usage" mode or non-failing usage mode. FIG. 2B illustrates two distinct control methodologies. A first control approach, designated as "worst case pressure," represents a control strategy wherein the vacuum pressure is maintained at a maximum level sufficient to exceed all anticipated detaching forces throughout the operational cycle. This approach ensures reliable load retention but may result in suboptimal energy consumption. A second control approach, designated as "optimized pressure," represents a control strategy wherein the control apparatus 320 dynamically adjusts the vacuum pump 360 operation to apply sufficient pressure in response to real-time force variations. In one embodiment the operation parameters are communicated by sensor(s) 310. The optimized pressure control tracks the varying lift forces and adjusts the vacuum level accordingly, thereby providing improved energy efficiency while maintaining adequate load retention capability. The optimized control system responds to the dynamic force fluctuations during the lifting and moving phase, applying only the necessary vacuum pressure required to counteract the instantaneous detaching forces. As used herein, the terms "lift conditions" and "lift forces" are employed in their broadest sense and may refer to sensor readings obtained from sensor(s) 310. Various embodiments of the vacuum gripper apparatus may incorporate a plurality of sensing elements, including but not limited to pressure sensors, acceleration sensors, angular orientation sensors, and temperature sensors, configured to monitor operational parameters of the system. Without limiting the scope of the present invention, it will be understood that the optimized pressure may be maintained by one or more of the following means: (i) activating the vacuum pump; or (ii) the seal maintaining the pressure against a smooth surface while the vacuum pump is in an off state or operating in a reduced power mode.

Figure 2C:
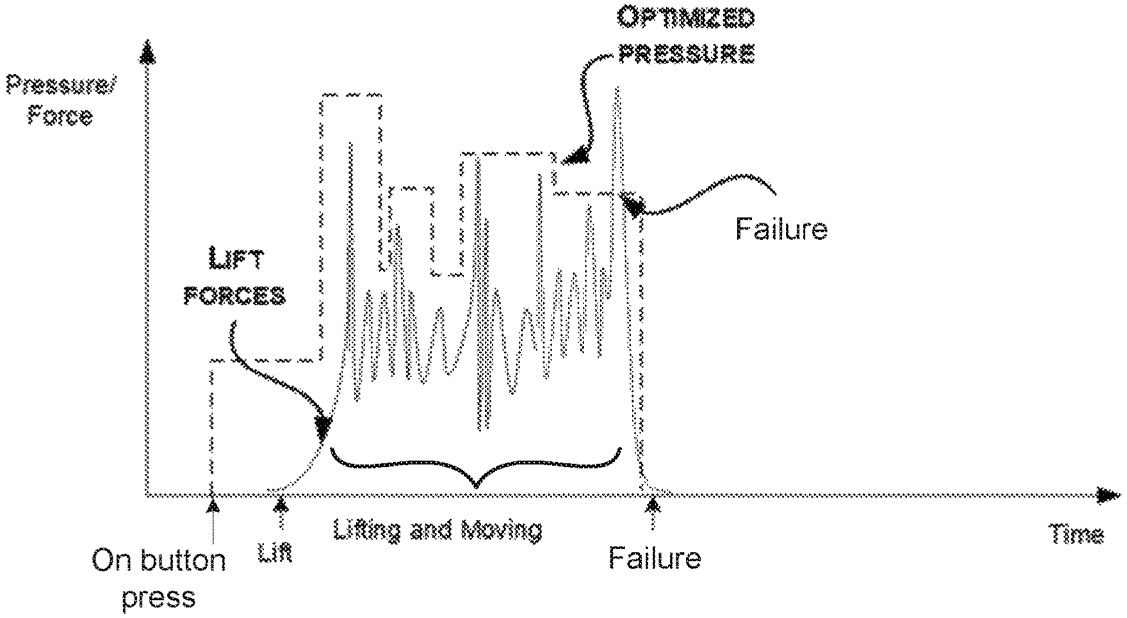
FIG. 2C shows a time diagram of load forces and vacuum pressure of a failing operation of the vacuum gripper.

Referring to FIG. 2C, a failure condition is illustrated wherein the control system fails to apply adequate vacuum pressure, resulting in load detachment from the vacuum gripper apparatus 100. At the point of failure, load 160 separates from the vacuum gripper 100, causing a sudden pressure drop within the seal 120. A near-failure condition may be defined as a condition where the detaching force is within a pre-defined proximity to the holding pressure force. In one embodiment, sensor(s) 310 are configured to detect the pressure drop event and generate a trigger event to store the operational conditions preceding the failure in memory 323. These stored failure conditions may be subsequently analyzed by controller 320 or communicated via communication unit 327 for further analysis as described hereinafter. The failure detection and data logging capability enables post-failure analysis to identify contributing factors and improve future operational performance of the vacuum gripper apparatus. The detection of trigger events may be performed by the AI inference model, wherein the model analyzes sensor data patterns and operational parameters to identify conditions warranting data storage for subsequent analysis. The AI program may be configured to recognize one or more of: complex operational patterns, anomalous behaviors, or predictive indicators that precede potential failure conditions, thereby enabling proactive data collection prior to occurrence of critical system failures.

The controller 320 is configured to respond to various trigger events or trigger conditions that cause the system to store sensor data and operational parameters in storage 323. A "trigger event" as used herein refers to any detectable condition or occurrence that initiates data logging and storage procedures. Trigger conditions may include, but are not limited to, failure to maintain adequate vacuum pressure, detection of near-failure conditions where operational parameters approach predetermined threshold values, sudden pressure drops within the seal, load detachment events, sensor readings exceeding normal operational ranges, detection of abnormal acceleration or movement patterns, temperature variations beyond specified limits, and user-initiated diagnostic procedures. Trigger events may be generated as an output of the AI inference model. Trigger events can further activate corrective control actions including secondary or non-linear control measures. In one embodiment, a secondary control measure may comprise activating the vacuum pump to maximum capacity.

Additional trigger events may comprise one or more of: system startup sequences, periodic data collection intervals, statistical sampling operations, communication connection establishment events, battery level warning conditions, predetermined sensor reading thresholds, pre-trained inference model detection events, or any combination thereof.

In one embodiment, failure events are monitored and tracked during a development phase by a design team to optimize the inference model prior to commercial deployment. In an alternative embodiment, failure events are monitored and tracked by vacuum gripper apparatuses during normal operation by end users, wherein the failure data is communicated back to the manufacturer via the communication unit 327 for subsequent analysis and refinement of the control program. This field data collection enables continuous improvement of control algorithms based on real-world operational conditions and failure patterns encountered by users. For purposes of this disclosure, the term "field" or "field conditions" refers to the operational environment where the vacuum gripper is deployed and utilized by users in real-world applications, as distinguished from controlled manufacturing, laboratory, or development facility environments. Field usage encompasses the actual working conditions, including but not limited to industrial facilities, commercial operations, or other end-user environments where the vacuum gripper performs its intended functions.

As used herein, "failure detection" refers to the capability of the sensor system to identify when the vacuum gripper apparatus has failed to maintain adequate holding force, typically characterized by a sudden pressure drop within the seal or load detachment. "Failure analysis" encompasses the process of examining stored operational parameters, sensor data, and environmental conditions that preceded, accompanied, or followed a failure event to identify contributing factors and operational patterns. "Failure communication" refers to the transmission of failure-related data, including but not limited to sensor readings, operational parameters, timestamp information, and failure classification data, from the vacuum gripper apparatus to a remote system or manufacturer via the communication unit for further processing and analysis. These failure management capabilities collectively enable systematic identification, documentation, and resolution of operational deficiencies in the vacuum gripper system.

Figure 3:
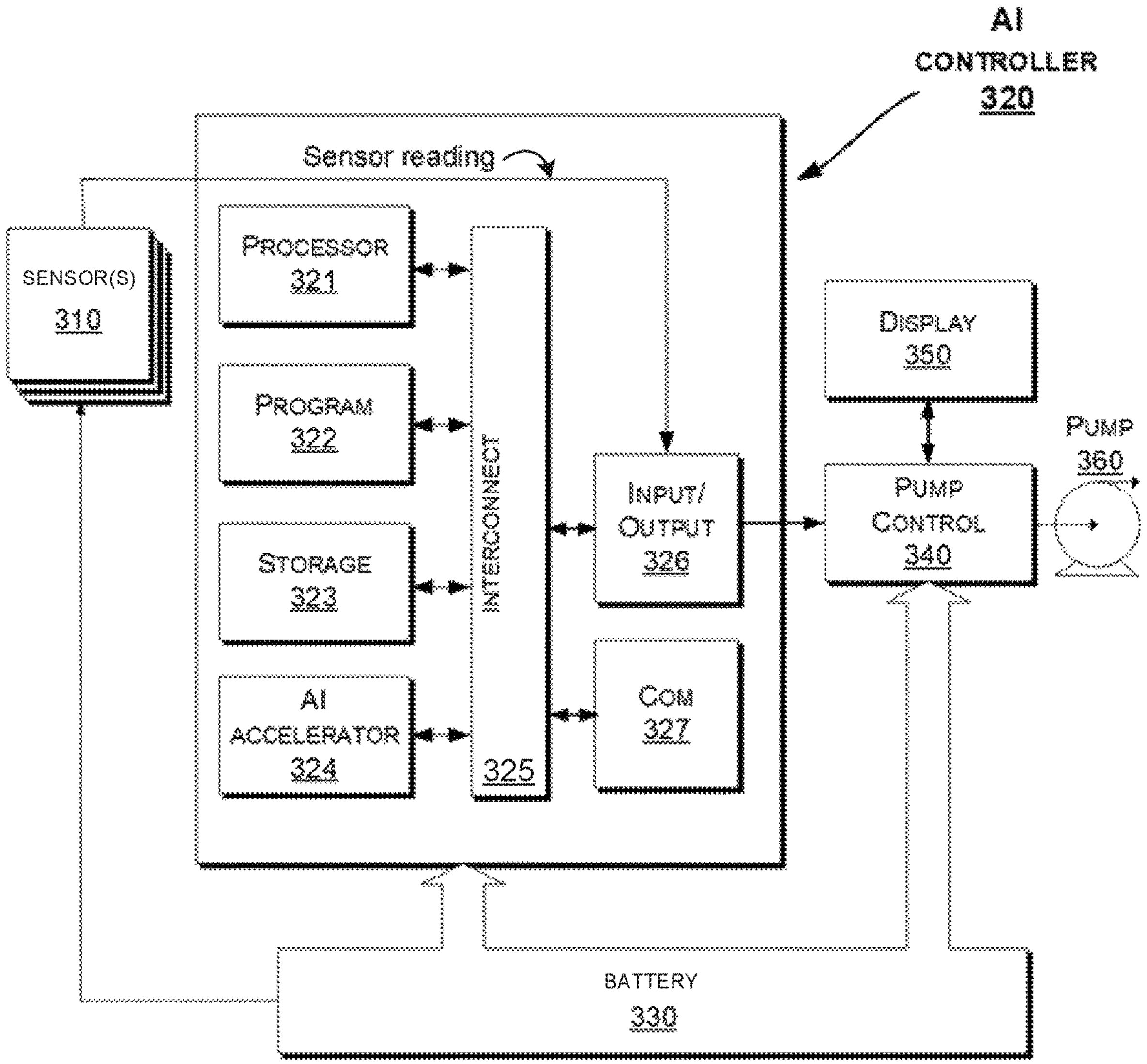
FIG. 3 illustrates a block diagram of the AI-controlled vacuum gripper controller system showing the interconnection of key components including sensors, processing unit, pump control, and user interface elements.

Referring to FIG. 3, the present invention comprises an AI-controlled vacuum gripper controller system designated generally as reference numeral 300. The system provides intelligent control of vacuum gripping operations through real-time sensor feedback and artificial intelligence processing, and generates vacuum pump output control signals. The AI controller apparatus comprises a central processing unit 321 (CPU) configured to execute computational operations and coordinate system functions, a program memory 322 operatively coupled to the CPU 321 and configured to store one or more control programs comprising executable instructions for controlling device operations, and a data memory 323 configured to store operational parameters, sensor data, and system state information. An interconnect subsystem 325 is provided comprising one or more communication buses configured to facilitate data transfer between the CPU, the program memory, the data memory, and other system components. The controller further comprises a communication unit 327 operatively coupled to the interconnect subsystem and configured to read and write external data through one or more communication protocols, whereby the communication unit enables bidirectional data exchange with external systems and devices. An input/output interface 326 is provided, the input/output interface being operatively coupled to the CPU through the interconnect subsystem and configured to generate control signals for controlling one or more external devices and to receive input signals from external sensor(s) 310 or user interfaces. A display unit 350 is operatively coupled to the controller and configured to present visual information comprising system status, operational parameters, and user interface elements. It will be understood by those skilled in the art that various modifications and additional components can be incorporated into the controller without departing from the scope of the invention, including but not limited to additional memory modules, specialized processing units, and alternative communication interfaces.

The AI Controller 320 comprises the following components:

Processor 321: A central processing unit that executes instructions that, when executed, perform an AI control algorithm and coordinate system operations. Processor 321 receives sensor data, processes the data, and generates control signals for the vacuum pump system.

Program Memory 322: Software instructions stored in memory that define the AI control algorithms, sensor processing routines, and pump control logic. The program memory 322 contains machine learning models and control parameters optimized for vacuum gripping applications. In one embodiment, the AI control algorithm comprises an inference model previously trained on vacuum gripper operation. Another embodiment can further implement a neural network-based PID algorithm.

Data Memory 323: Including RAM and non-volatile memory for storing parameters and calibration data, operational parameters, sensor reading history, and AI model parameters. In one embodiment, the data memory 323 may store operation statistics and sensor data for subsequent use in future training and improvement of the AI model.

AI Accelerator 324: The AI program can be executed on processor 321. In some embodiments, the AI controller 320 can further include dedicated hardware for accelerating artificial intelligence computations, including neural network processing and pattern recognition algorithms. The AI Accelerator 324 enables real-time processing of complex control algorithms.

Interconnect 325: Internal communication system that facilitates data transfer between the processor 321, data memory 323, AI accelerator 324, and other components within the AI Controller 320. The interconnect may comprise, but is not limited to, a bus, mesh, ring, or on-die network architecture.

Input/Output Interface 326: Multi-channel interface providing connectivity to the external sensor(s) 310, pump control systems, and user interface components. The I/O interface 326 may support various communication protocols and signal types.

Communication Module 327: Wireless and/or wired communication interface. In one embodiment, it enables reading data stored in data memory 323. In another embodiment, it can update the content of the program memory with a new control program or AI model. The communication module 327 may support protocols such as Wi-Fi, Bluetooth, USB, or other industrial communication standards.

Sensor System: The system incorporates at least one sensor configured to generate sensor data readings for the control module 320. The sensor may comprise a pressure sensor indicating the vacuum level in the chamber. In another embodiment, it may comprise an accelerometer generating readings on the angle, velocity, and acceleration of the vacuum gripper. In another embodiment, it may further comprise a force sensor indicating the load that the vacuum gripper is lifting. In yet another embodiment, it may further incorporate a temperature sensor.

Pump Control System: The Pump Control 340 receives control signals from the AI Controller 320 and regulates the operation mode of Pump 360. The Pump 360 generates the vacuum force required for the gripper operation. By controlling the pump, the system controls the vacuum in the seal chamber. In one embodiment, the pump control system 340 can set the operation mode by modulating pump speed using a PWM controller. In another embodiment, it can provide on/off control signals.

Power System: The system may be powered by a battery 330 (e.g., a rechargeable lithium-ion battery), providing portable operation and consistent power delivery. The battery 330 supplies power to all system components including the AI Controller 320, sensor(s) 310, Pump Control 340, Pump 360, and Display 350. Controlling the vacuum pump by the AI controller module 320 performs battery capacity management and maximizes the duration that the vacuum gripper can operate before requiring recharging.

User Interface: Display 350 provides visual feedback to the operator, showing system status, sensor readings, vacuum levels, and operational parameters. The display 350 may comprise an LCD, LED, or OLED display capable of presenting status indications or textual and graphical information. In another embodiment, the interface may comprise an audio signal device such as a beeper.

Figure 4A:
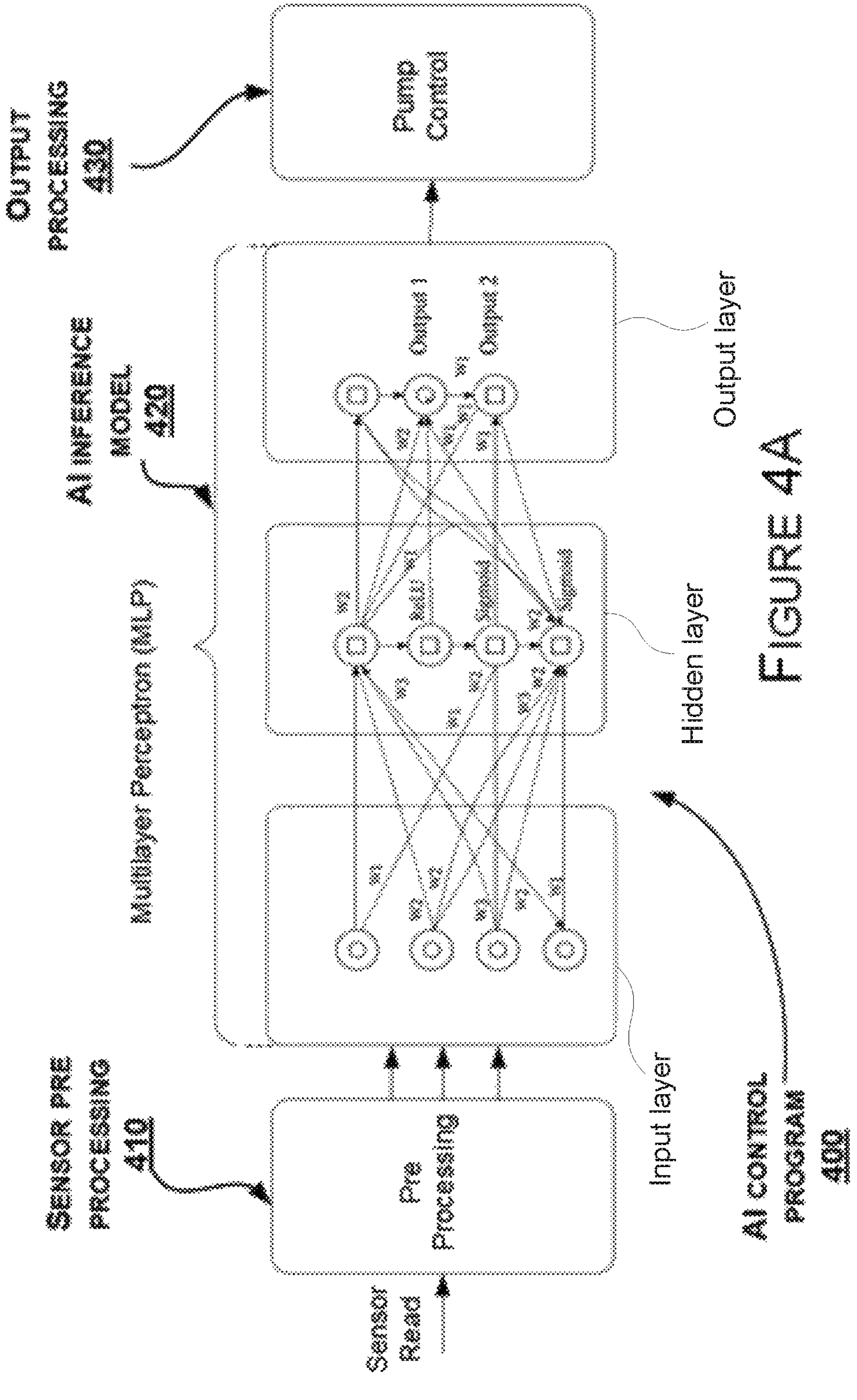
FIG. 4A illustrates a block diagram of the control program with AI inference that controls the vacuum pump.

Referring to FIG. 4A, there is shown an embodiment of a control program 400 comprising an artificial intelligence (AI) inference model for automated pump control systems. The control program comprises a plurality of interconnected processing blocks configured to receive sensor inputs, process the inputs through an AI inference model, and generate control outputs for pump operation.

Sensor Pre-Processing Block 410: In one embodiment, the control program incorporates a sensor pre-processing block 410 operatively connected to receive raw sensor data from one or more sensors. The sensor pre-processing block 410 is configured to perform a normalization process on the received sensor data to standardize input values for subsequent processing by the AI inference model 420. In a first embodiment, the normalization process accepts an input parameter representing force measurements within a predetermined range of 0-100 kilograms and translates the input to a normalized range of 0-1. In an alternative embodiment, the pre-processing block 410 is configured to receive a plurality of sensor readings having different physical units and disparate value ranges and normalize all received sensor readings to a standardized range of 0-1.

In another embodiment, the pre-processing block 410 is further configured to perform computational functions on the input sensor data and extract additional derived outputs. In such embodiments, the pre-processing block 410 may perform mathematical differentiation of the input values to calculate rate of change parameters. In yet another embodiment, the pre-processing block 410 may perform integration operations to calculate average values over predetermined time intervals. In a further embodiment, the pre-processing block 410 may perform computations combining a plurality of sensor readings and generate a single output value.

The output of the pre-processing block 410 comprises a plurality of values or features that can be referred to as a feature vector of predetermined length. In one embodiment, the feature vector length may be equal to the number of nodes in the input layer of the AI inference model 420.

AI Inference Model (420): In one embodiment, the AI inference model 420 comprises an input layer comprises plurality of input nodes operatively connected to receiving the processed sensor data from the pre-processing block 410. The inference model 420 is configured to apply a pre-loaded neural network model to the processed sensor data and generate corresponding outputs on the at least one output node of an output layer.

In one embodiment, the inference model 420 comprises a Multi-Layer Perceptron (MLP) neural network architecture having at least one input layer, one or more hidden layers, and at least one output layer. The MLP embodiment includes:

Input Layer: A plurality of input nodes configured to receive normalized sensor data, each input node corresponding to a specific sensor parameter or derived computational value from the pre-processing block 410.

Hidden Layer(s): At least one hidden layer comprising a plurality of neurons, each neuron implementing a non linear activation functions. Each neuron in the hidden layer is connected to the input nodes through weighted connections (w1, w2, w3, etc.) that are determined during a training phase of the neural network.

Output Layer: At least one output layer comprising one or more output nodes (Output 1, Output 2) configured to generate control signals based on the processed information from the hidden layer(s). The output layer neurons are connected to the hidden layer neurons through additional weighted connections.

In another embodiment, the artificial intelligence model comprises a feed forward neural network to capture temporal dependencies in sensor measurements when generating control outputs.

In yet another embodiment, the artificial intelligence model comprises a convolutional neural network particularly suited for processing time-series sensor data or spatial patterns in multi-sensor arrays.

While neural network-based implementations are described in detail herein, it should be understood that other machine learning approaches may be employed without departing from the scope of the invention. Alternative implementations may include, but are not limited to, support vector machines (SVMs), decision trees, random forests, gradient boosting machines, Bayesian networks, k-nearest neighbors algorithms, ensemble methods, or hybrid approaches combining multiple machine learning techniques.

The inference model 420 is trained using historical sensor data and corresponding desired control outputs to establish optimal weight values for the connections between neurons. The sensor data that is used for training the model may comprise data collected during development of the vacuum gripper. In another embodiment it may further collect sensor data from end users in operations.

Output Processing Block (430): The output processing block 430 is operatively connected to receive at least one AI inference model output from the inference model 420 and is configured to translate said outputs into specific pump operation mode.

In one embodiment, the output processing block 430 generates binary on/off control signals for pump operation. In another embodiment, the output processing block 430 is configured to generate Pulse Width Modulation (PWM) control signals within a predetermined range of 0 to 100% power output, thereby enabling variable speed pump control.

In yet another embodiment, the AI inference model 420 is configured to generate control parameters Ki (integral gain), Kp (proportional gain), and Kd (derivative gain) for implementation in a Proportional-Integral-Derivative (PID) controller system. In such embodiments, the output processing block 430 comprises a PID controller that utilizes the AI-generated parameters to provide closed-loop control of the pump system.

System Integration and Operation: The control program operates in real-time to continuously monitor sensor inputs at pre-defined time interval. The time interval can be, but not limited to a range between 1 and $100\times10^{-3}$ Seconds. The control program processes the data through the AI inference model, and generate appropriate pump control commands. The system is configured to adapt to varying operational conditions through the AI inference model's ability to recognize patterns and relationships in the sensor data that may not be apparent through traditional control methods. In one embodiment the inference model may be configured to read load forces and rate of change and predict the need for increased pressure. In yet another embodiment, the inference model may be trained to accept average pressure reading and rate of change and predict air pressure leaks of rough material and the need to adapt to the surface by increasing vacuum pump activity. The modular architecture of the control program allows for scalability and customization based on specific application requirements, with the AI inference model serving as the central intelligence component that bridges sensor inputs with optimal pump control strategies.

Figure 4B:
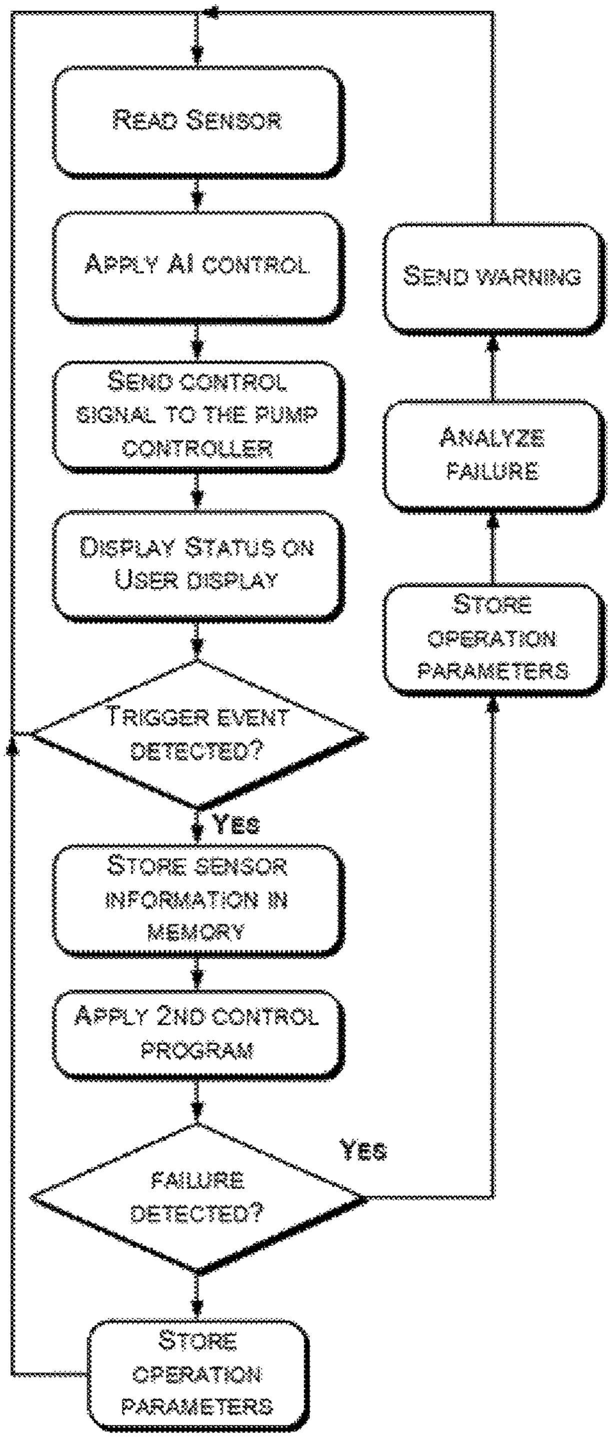
FIG. 4B illustrates a flow diagram of the control program that controls the vacuum pump.

Referring to FIG. 4B, a flowchart illustrates the main control program for the vacuum gripper apparatus. The control process initiates by reading sensor 310 data, followed by applying AI control algorithms 400 to determine appropriate vacuum pressure levels as previously described with reference to FIG. 2B. The system then sends control signals to the pump controller 340 and display 350.

In one embodiment, the control program may execute the AI control 400 incorporating a Multilayer Perceptron (MLP) with output layer generating pump control mode. Such mode can be pump on/off, one of a pre-defined set of pump power level between off and full power or a set of parameters Ki (integral gain), Kp (proportional gain), and Kd (derivative gain) for implementation in a Proportional-Integral-Derivative (PID) controller system. In yet another embodiment of the invention, the output layer of the inference model further generates a trigger event. In one embodiment, the inference model is configured to generates a trigger event corresponding to prediction of developing failure or near failure conditions as described with reference to FIG. 2C. In another embodiment, the control program generates a trigger event in accordance to pre-defined usage time intervals, battery status, high lift forces or operation condition statistics. When no trigger event is detected, the system returns to the sensor reading phase, creating a continuous control loop. However, when a trigger event is detected indicating potential operation conditions approaching failure thresholds, the system applies a secondary pump control action as a strategy designed to compensate for extreme operational conditions and attempt to prevent system failure. This secondary action provides enhanced response characteristics when the primary action may be insufficient to maintain adequate vacuum pressure under rapidly changing conditions. The secondary control mechanism may comprise, but is not limited to, non-linear control (NLC) algorithms or application of maximum available pump pressure until operational conditions stabilize. In one implementation, the secondary control strategy applies the maximum vacuum pressure that the pump is capable of producing, thereby ensuring maximum holding force during critical operational periods when system stability is at risk of being compromised.

The control program may further executes a failure management sequence comprising: storing failure parameters from sensor 310 in memory 323 and may further trigger analyzing procedure of the failure conditions. The stored failure parameters may subsequently be available for further processing and analysis as described elsewhere in this specification. In another embodiment, the inference model may generate in the output layer an output to displays operational status on a user display interface 350.

Figure 4C:
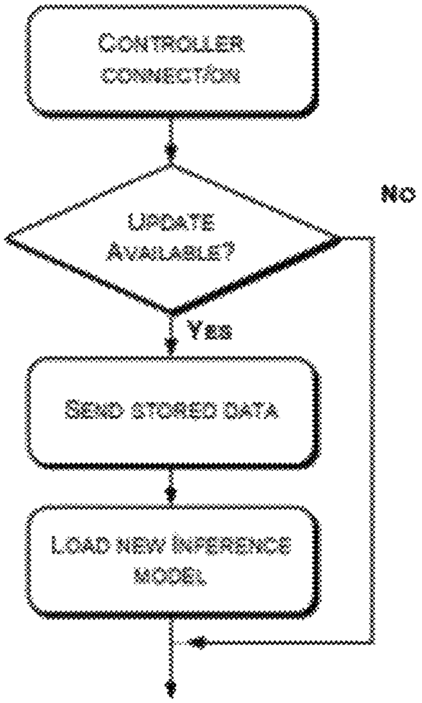
FIG. 4C illustrates the program update on new AI inference model and control program to the vacuum gripper and the sensor data upload from the vacuum gripper.

Referring to FIG. 4C, a program update flowchart illustrates one embodiment of communication and update capabilities of the vacuum gripper apparatus. The update process initiates when the controller establishes connection with a remote server or manufacturer system. The system then determines whether updates are available for download or when failure data is available for upload. When no updates are available, the process terminates and returns to normal operation. However, when updates are detected as available, the system executes a bidirectional data exchange process comprising: transmitting stored failure condition data to the remote system and downloading new inference models or program updates to the local controller. This update mechanism enables continuous improvement of the AI control algorithms through field data analysis and model refinement. The communication process may be initiated manually by an operator through a service call procedure or automatically whenever the communication unit (COM) 327 detects an available network connection.

In various embodiments, not all vacuum gripper apparatus units may be equipped with data storage capabilities. The data collection and storage functionality may be selectively deployed to a predetermined subset of vacuum gripper units for statistical data collection purposes. This selective deployment approach enables manufacturers to gather representative operational data across a distributed fleet while optimizing manufacturing costs and system complexity for standard production units. As used herein, the term "usage mode" refers to various ways in which a user operates the vacuum gripper and various portions of the operational cycle, including but not limited to: powering on the device, connecting to a communication device, and the normal operational cycles and failure cycles described herein.

As used herein, a "service call" encompasses any communication session between the vacuum gripper apparatus and a remote system, including but not limited to user-initiated maintenance requests, automatic diagnostic data transmission, firmware update procedures, failure data reporting, performance optimization updates, and any bidirectional exchange of operational data, control parameters, or software components between the apparatus and manufacturer or service provider systems.

Figure 5:
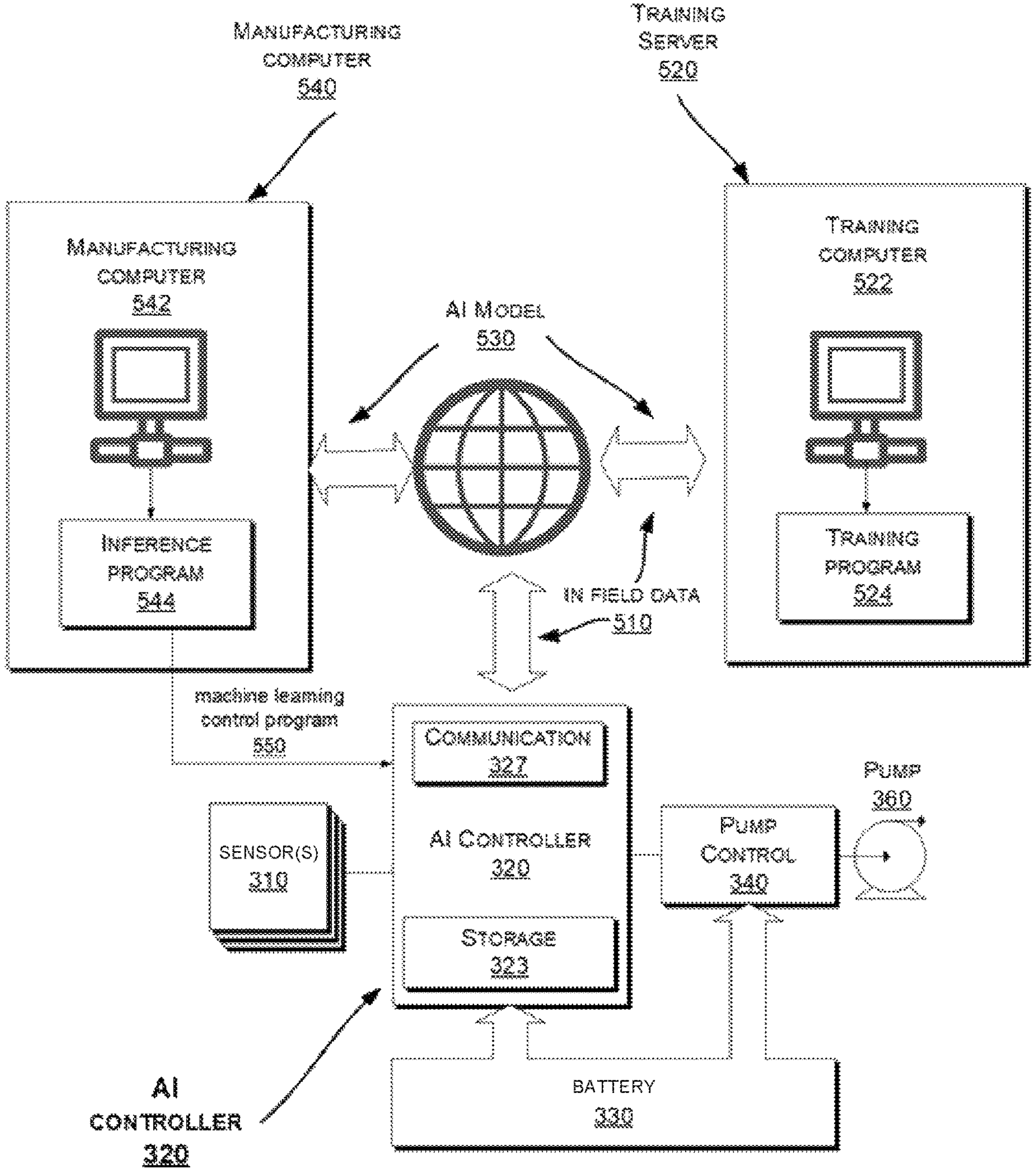
FIG. 5 illustrates the process of collecting sensor data and vacuum gripper operation information, uploading to a training server, generating AI inference model, communicating to a manufacturing computer and loading to vacuum gripper.

Referring to FIG. 5, an AI training system architecture illustrates the comprehensive machine learning development process for the vacuum gripper apparatus. The training process utilizes operational data comprising sensor data and vacuum gripper operational parameters collected from multiple sources. Data collection occurs during product development phases through vacuum gripper apparatus operated by technicians, as well as from real-world field operations through service calls as previously described with reference to FIG. 4B. The collected operational data is transmitted via communication network 510 to training server 520, which comprises at least one training computer 522 running training program 524. The communication unit 324 establishes connection to the training server and facilitates data transfer 510 through various communication pathways. In different embodiments, the connection may be implemented via a dedicated communication device designed specifically for the vacuum gripper apparatus, pre-configured with the vacuum gripper parameters such as network ID and device serial number, providing optimized communication protocols and enhanced security features. Alternatively, the communication unit 324 may utilize WiFi connections to connect to an internet router, enabling network access through existing infrastructure. In other embodiments, communication may be facilitated through intermediate computing devices, such as a personal computer, notebook computer, or cellular application running on a mobile device, which serve as communication bridges between the vacuum gripper apparatus and the remote training server. These various communication modalities provide flexibility in deployment scenarios and accommodate different operational environments and user preferences. In other implementations, various communication technologies can be implemented including, but not limited to infra-red communication, physical electrical connector, SD memory card or radio Frequency communication.

The training computer 522 may be implemented as a local computer system at the manufacturer facility, a remote data center system, cloud computing infrastructure, or distributed computing resources. The training program 524 processes the collected field data to generate AI inference model 530, which encapsulates the learned control algorithms and operational parameters. The generated AI inference model 530 is subsequently transmitted via the communication network to manufacturing computer 540, which comprises manufacturing computer 542 executing inference program 544. The manufacturing computer 540 loads the inference program, which may comprise part or all of the machine learning control program 550, into the program memory 322 of a vacuum gripper apparatus.

The inference program loading occurs initially during manufacturing and may be subsequently updated in the field through the update process described with reference to FIG. 4B. In various embodiments, the training server 520 and manufacturing computer 540 may be implemented as the same computing system or as separate distributed computing resources, providing flexibility in system architecture and deployment configurations.

What is claimed is:

1. A vacuum gripper, comprising:
- a base element;
- a seal element operatively connected to the base element;
- a vacuum pump in fluid communication with the seal element;
- at least one sensor configured to generate sensor data indicative of an operational parameter of the vacuum gripper, wherein the sensor data comprises at least one of air pressure data, velocity data, acceleration data, temperature data, and force data associated with the vacuum gripper;
- a machine learning electronic controller supported at least indirectly by the base element, the machine learning electronic controller comprising:
- at least one processing element; and
- a non-transitory storage medium storing machine-readable instructions that, when executed by the at least one processing element, cause the machine learning electronic controller to:
  - receive the sensor data comprising at least the air pressure data indicative of vacuum pressure within a chamber and motion the acceleration data indicative of acceleration of the vacuum gripper;
  - execute a machine learning control program comprising an artificial intelligence model;
  - perform inference on the received sensor data using the artificial intelligence model to infer at least one of a detaching force acting on an object gripped by the vacuum gripper or a failure condition-margin between a holding force generated by the vacuum pressure and the detaching force is within a predefined proximity; and
  - generate a control output that controls an operating mode of the vacuum pump to dynamically maintain a vacuum pressure corresponding to a minimum required holding force sufficient to counteract the inferred detaching force.

2. The vacuum gripper of claim 1, wherein the machine learning electronic controller further comprises an AI accelerator operatively connected to the at least one processing element, wherein the AI accelerator is configured to perform at least a portion of the inference operations of the artificial intelligence model.

3. The vacuum gripper of claim 1, wherein the artificial intelligence model comprises:
- an input layer configured to receive the received sensor data;
- at least one hidden layer operatively connected to the input layer and configured to process data from the input layer; and an output layer operatively connected to the at least one hidden layer and configured to generate the inference outputs.

4. The vacuum gripper of claim 3, wherein the operating mode of the vacuum pump comprises at least one of: pump speed adjustment, duty cycle modification, or complete pump shutdown.

5. The vacuum gripper of claim 3, further comprising a communication module operatively connected to the machine learning electronic controller, wherein the machine-readable instructions further cause the machine learning electronic controller to:

receive an updated artificial intelligence model via the communication module;

store the updated artificial intelligence model in the non-transitory storage medium; and execute the machine learning control program using the updated artificial intelligence model for subsequent inference operations.

6. The vacuum gripper of claim 3, wherein the at least one sensor comprises a pressure sensor operatively connected to the chamber formed between the base element and the seal element.

7. The vacuum gripper of claim 3, wherein the at least one sensor comprises an accelerometer operatively connected to the machine learning electronic controller and configured to measure at least one of: orientation, velocity, and acceleration of the vacuum gripper.

8. The vacuum gripper of claim 3, wherein the at least one sensor comprises a force sensor operatively connected to the machine learning electronic controller and configured to measure at least one of: weight of an object gripped by the vacuum gripper and detachment force applied to the object.

9. The vacuum gripper of claim 1, wherein the machine-readable instructions further cause the machine learning electronic controller to:

execute a sensor pre-processing function on the received sensor data prior to performing inference using the artificial intelligence model;

generate preprocessed sensor data based on the sensor pre-processing function;

provide the pre-processed sensor data to the input layer of the artificial intelligence model; and perform inference using the artificial intelligence model on the pre-processed sensor data to generate the inference outputs.

10. The vacuum gripper of claim 9, wherein the sensor pre-processing function comprises at least one of: normalization configured to scale the received sensor data to a predetermined numerical range, differentiation configured to compute a rate of change of the received sensor data, and integration configured to compute a cumulative value of the received sensor data over time.

11. The vacuum gripper of claim 10, wherein the preprocessed sensor data comprises a feature vector having a predetermined dimensionality corresponding to a number of input nodes in the input layer.

12. The vacuum gripper of claim 1, wherein the machine-readable instructions, when executed by the at least one processing element, further cause the machine learning electronic controller to:

generate a trigger event based on at least one of the sensor data, time, and usage mode, wherein the trigger event comprises at least one of a failure condition, a near-failure condition, and detection of operational parameters exceeding predetermined threshold values;

generate a secondary control output, wherein the secondary control output controls at least one of an alarm signal and an alternate vacuum pump operating mode.

13. The vacuum gripper of claim 12, wherein the machine-readable instructions, when executed by the at least one processing element, further cause the machine learning electronic controller to:

detect a trigger event;

in response to the trigger event, store at least one of: the trigger event, sensor data collected proximate to the trigger event, and the usage mode; and retain the stored data for subsequent analysis.

14. The vacuum gripper of claim 13, further comprising a communication module operatively connected to the machine learning electronic controller, wherein the machine-readable instructions further cause the machine learning electronic controller to:

establish communication with a remote training server via the communication module; and transmit the stored data to the remote training server for at least one of: analysis, model retraining, or diagnostic evaluation.

* * * * *